United States Patent

[11] 3,622,601

[72] Inventor James W. Dale
Winchester, Mass.
[21] Appl. No. 802,741
[22] Filed Feb. 17, 1969
[45] Patented Nov. 23, 1971
[73] Assignee Monsanto Research Corporation
St. Louis, Mo.

[54] FLUORINATED EPOXIDE
9 Claims, No Drawings

[52] U.S. Cl. .................................................. 260/348.5 R,
260/348 R, 260/653

[51] Int. Cl. ......................................................... C07c 19/08,
C07d 1/06
[50] Field of Search ............................................ 260/348.5,
348.5 LV Primary Examiner—Norma S. Milestone
Attorneys—R. M. Dickey, L. A. Ferris and M. B. Mashier ABSTRACT: Method of producing a perfluorinated 1,2-epoxide comprising contacting a perfluorinated olefin with oxygen difluoride. The perfluorinated epoxides can be used to produce polymers which are useful lubricants.

FLUORINATED EPOXIDE

This invention relates to epoxides and, more particularly, provides a novel method of making perfluorinated 1,2-epoxides.

fluorinated 1,2-epoxides can be converted to polymers including homopolymers and copolymers with fluorinated olefins. Polymers of the fluorinated epoxides have been produced having the viscosity of a lubricating fluid, and having been shown to have valuable properties for applications such as lubrication.

In fluorinated compounds, the extreme electronegativity of the fluorine substituent generally has pronounced effect on reactive sites in the molecule, and conventional methods for epoxide synthesis are, for this reason, apt to be inapplicable to the production of perfluorinated epoxides or, at least, to be poorly applicable thereto. It is known that preparation of perfluorinated epoxides can be accomplished by treatment of the corresponding alkylene oxides with HF in a Simons cell. However, this electrochemical synthesis is a cumbersome, inconvenient procedure, so that the development of alternative methods is desired.

It is an object of this invention to provide a novel method for the production of perfluorinated 1,2-epoxides.

A particular object of this invention is to provide a novel method for the production of perfluorinated 1,2-epoxides from perfluorinated olefins.

THese and other objects will become evident upon a consideration of the following specification and claims.

It has now been found that substantially complete conversions of perfluorinated olefins to the corresponding 1,2-epoxyperfluoroalkanes can be effected by reaction with oxygen difluoride in accordance with the following equation:

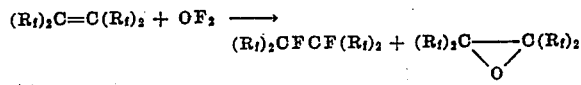

where each $R_f$ radical is a fluorine-containing substituent selected from the class consisting of F and perfluorinated hydrocarbon radicals.

Separation of close-boiling mixtures of the perfluorinated epoxides and by-products of reactions in which they are formed is frequently difficult. With the present method, the perfluorinated alkane formed at the same time as the perfluorinated epoxide, in accordance with the above equation, provides an inert diluent which would not interfere and would remain unreacted during conversions of the epoxide to desired products, such as polymers, so that its subsequent separation can be readily accomplished.

The present method may be employed for the conversion of a variety of perfluorinated olefins to the corresponding 1,2-epoxides. Useful olefins consist of F and C atoms and contain olefinic unsaturation, that is, one or more carbon-to-carbon double bonds which are not part of a resonating aromatic ring system. The olefinic unsaturation may be present in an open chain or in a cycloaliphatic ring. The compound containing the stated olefinic unsaturation will be saturated except for the presence of olefinic and any aromatic unsaturation, and may be an open-chain perfluoroalkene, a perfluorocycloalkene or perfluorocycloalkylalkene, or a perfluoroarylalkene.

Thus, exemplary of the presently useful perfluorinated olefins are the straight and branched open chain perfluoroalkenes such as perfluoruethylene, perfluoropropene, perfluoro-1-butene, perfluoro-2-butene, perfluoroisobutene, perfluorobutadiene, perfluoro-1-pentene, perfluoro-2-pentene, perfluoro-2-methyl-1-butene, perfluoro-3-methyl-1-butene, perfluoro-2-methyl-2-butene, perfluoro-1-hexene, perfluoro-3-hexene, perfluoro-4,4-dimethyl-1-pentene, perfluoro-1-heptene, perfluoro-2ethyl1-butene, perfluoro-1-octene, perfluoro-1-isooctene, perfluorononene, perfluorodecene, and the like. Exemplary of other presently useful perfluorinated olefins are those containing cyclic radicals such as perfluorocyclohexene, perfluorocyclohexadiene, perfluorocyclopentene, perfluorocyclooctene, perfluorocyclodecene, perfluorocyclohexylethylene, perfluoro-3-cyclohexylpropene, perfluoro-4-cyclohexyl-1-butene, perfluoro-2-cyclohexyl-2-methyl-propene, perfluoro-1,2-dicyclohexylethylene, perfluoro(4-isobutylcyclohexyl) ethylene, perfluorostyrene, perfluoro-1,2-diphenylethylene, perfluoronaphthylethylene, perfluoro-3-phenylpropene, perfluoro-3-phenyl-2-methylpropene, and the like. As exemplified in the foregoing list, perfluorinated olefins of from two to 14 carbon atoms can be used in the present process. The lower perfluorinated alkenes, which are perfluorinated olefinic hydrocarbon compounds of from two to six carbon atoms with an open chain structure, are a preferred starting material, and the terminally unsaturated lower perfluorinated alkenes, of the stated nature, are especially preferred.

Exemplary of the epoxy products producible in accordance with the invention are 1,2-epoxyperfluoroethane, 1,2-epoxyperfluoropropane, 1,2-epoxyperfluoroisobutane, 1,2-epoxyperfluorobutane, 2,3-epoxyperfluorobutane, 2,3-epoxyperfluoro-2-methylbutane, 2,3-epoxy-perfluoro-2,3-dimethylbutane, 1,2-epoxyperfluoropentane, 2,3-epoxyperfluoropentane, 1,2-epoxyperfluoro-2-ethylbutane, 1,2-epoxyperfluorooctane, 1,2-epoxyperfluoro-1-cyclohexylethane, 1,2-epoxyperfluoro-1,2-dicyclohexylethane, 1,2-epoxyperfluoro-2-cyclohexyl-2-methyl-propane, perfluoroepoxyethylbenzene, perfluoro-(p-epoxyethyl)-toluene, 1,2-epoxyperfluoro-1,2-diphenylethane, and so forth.

Oxygen difluoride is a known compound, readily preparable, for example, by the procedure described in Inorganic Syntheses, Volume 1, pages 109-11(McGraw-Hill, 1939).

The conditions for conducting the method of the invention consist simply of contacting the perfluorinated olefin with the oxygen difluoride. The stoichiometric ratio for conversion of the perfluorinated olefin in accordance with the above equation is 2 moles of olefin per mole of oxygen difluoride, but an excess of the latter reagent can advantageously be used, providing about a 1:1 molar ratio, for example, if desired. In general, the molar ratio of oxygen difluoride to perfluorinated olefin will be in the range of from 10:1 to 1:10 and about a 1:1 molar ratio is particularly suitable. When both the reactants are gases at the reaction temperatures and pressures, vapors phase reaction may be employed, wherein the reactants are contacted alone or admixed with gaseous inert diluents, such as nitrogen or carbon tetrafluoride. If desired, solvents or liquid diluents may be present, such as the perfluorinated alkanes such as perfluoropentane, perfluorohexane, perfluoroheptane, and the like. Oxygen difluoride being a very active reagent, materials of construction used to contain the reactants should be essentially inert. The reactor materials may, for example, be nickel, stainless steel, copper, or like materials of construction substantially inert to fluorinating agents or capable of passivation to render them inert to such materials. Prefluorination of reactors is sometimes advantageously used to passivate surfaces. The reaction can be conducted either continuously, in a flow reactor, or batchwise.

As will appear from the examples hereinafter, the reaction of the oxygen difluoride with the perfluorinated olefin can be conducted in the presence of a fluorination catalyst such as silver difluoride, with formation of the desired epoxide product, but the presence of such catalyst is much necessary.

Temperature conditions for the reaction can vary over a wide range. The optimum temperature for conversion of a particular perfluorinated olefin to the epoxide can vary rather substantially even as between closely similar olefins: for example, in a batch reaction, practically complete conversion of perfluoropropene to epoxide in accordance with the above equation is obtained in a couple of hours at between 0° and 20° C. whereas some 17 percent of the starting olefin remains unconverted after 16 hours at 90° C. under the same conditions starting from perfluoroisobutene. Generally, temperatures above about −50° C. are necessary to achieve reasonable rates of reaction and temperatures on the order of above 200° C. are usually unduly conducive to carbon-to-carbon bond cleavage, producing loss to byproducts.

The invention is illustrated but not limited by the following examples:

EXAMPLE 1

This example illustrates the conversion of a straight chain perfluorinated olefin to the corresponding 1,2-epoxide.

The reactor employed is a copper tube with an inside diameter of 1 and 13/64th inches and a total length of 42 inches. The length of the heating area is 26 (approximate volume of heated zone 400 cubic centimeters). The reactor is initially packed with silver plated copper wire gauze. The reactor is prepared for use by introducing a mixture of fluorine and nitrogen at a rate of about 80–90 milliliters per minute (ml./min.) each, while the reactor temperature is raised from 25° C. up to 200° C. over a period of 3 hours. Silver difluoride is thereby formed on the gauze. Prior to use, the reactor is stabilized by heating overnight at the desired reaction temperature with a nitrogen flow.

Oxygen difluroide diluted with nitrogen and perfluoropropene, at a flow rate of 44.3 ml/min. (gas volume) each, are passed into this reactor, while it is maintained at about 60° C (measured temperatures 45°–70°), for 90 minutes. The residence time in the reactor at this flow rate is 3 minutes. The total input is 8.8 g. (0.16 mole) of oxygen difluoride and 21.8 g. (0.146 mole) of perfluoropropene. The effluent from the reactor is collected in traps maintained at −78° and at −188° C, and the trap contents analyzed by vapor phase chromatography (VPC). It is found that 22 area-percent of the contents of the −78°trap is 1,2-epoxyperfluoropropane.

EXAMPLE 2

This illustrates the epoxidation of perfluoropropene at a lower temperature.

Using the same reactor as described in example 1, the same 44.3 ml./min. each flow rate of oxygen difluroide, nitrogen diluent and perfluoropropene is continued for the same time of 90 minutes, but the reactor is maintained at about 30° C. (20°–35°). Six area-percent of the contents of the −78°trapped effluent is unreacted perfluoropropene, and 16 area-percent is 1,2-epoxyperfluoropropane.

EXAMPLE 3

This example illustrates conversion of perfluoropropene to 1,2-epoxyperfluoropropane at a higher temperature.

Using the flow-through reactor described in example 1, and the same flow rate and total flow-through time as in example 1, 8.8 g. (0.16 mole) of oxygen difluoride diluted with nitrogen and 21.8 g. (0.146 mole) of perfluoropropene are passed through the reactor while it is maintained at about 120° C. (100°–130°). Of the product effluent volatile at room temperature and condensed at −78° C., 9 area-percent by VPC is 1,2-epoxyperfluoropropane.

EXAMPLE 4

THis example illustrates the conversion of perfluoropropene to 1,2-epoxyperfluoropropane with a shorter reaction time than in example 1.

The flow-through reactor, described in example 1, is held at an average temperature of 60° C. (40°–80° C. range), A flow rate of 88.6 ml./min. of each of the oxygen difuoride, its nitrogen diluent, and the perfluoropropene is maintained for 49 minutes, providing a total input of 0.18 mole of oxygen difluoride and 0.17 mole of perfluoropropene. Of the effluent trapped at −78° C., 23 percent is 1,2-epoxyperfluoropropane and 22 percent is unreacted perfluoropropene.

EXAMPLE 5

This example illustrates the conversion of perfluoropropene to epoxyperfluoropropane under different conditions.

In this run, a copper tube reactor is used which is packed with copper shot as a heat sink to avoid temperature surges. The tube has a 3.16 cm. inside diameter and a 100 cm. total length. The packing fills 80 cm. of the length of the reactor, and the heating jacket provided for the reactor covers 60 cm. of its length. The packed reactor is fluorinated prior to use.

The reactor is maintained at 25° C. during the run, with the effluent end connected to traps cooled to −78° and −188° C. A total of 8.9 g. (0.165 mole) of oxygen difluoride, diluted 50:50 by volume with nitrogen, and 21 g. (0.14 mole) of perfluoropropene are passed through the reactor, at a rate providing a residence time of 3 minutes and a total flow-through time of 157 minutes (25.7 ml./min. each). The effluent trapped at −188° is a yellow liquid consisting essentially of oxygen difluoride, and of the −78° trapped effluent, 9 percent is 1,2-epoxyperfluoropropane and 29 percent is unreacted perfluoropropene. Stream samples taken during the reaction are found to contain up to 16 percent of the epoxide.

EXAMPLE 6

This example describes a lower temperature reaction. The reactor used is that described in example 5, and the temperature is maintained at between −10° and 0° C., by jacketing in a glass condenser through which cooled methanol is circulated. A total of 9.2 g. (0.16 mole) of oxygen difluoride, diluted with nitrogen, and 20 g. (0.13 mole) of perfluoropropene are passed through the reactor, using a flow rate of 25.7 ml./min. for each. The total flow-through time is 158 minutes with a residence time of 2 minutes. A stream sample is taken after 45 minutes, which is held at room temperature for 3 hours prior to analysis by VPC. Of the carbonaceous materials in this sample, 41 percent is 1,2-epoxyperfluoropropane. Of the rector effluent trapped at −78° C., 5 percent is the 1,2-epoxyperfluoropropane, 5 percent is perfluoropropane and 88 percent is unreacted perfluoropropene.

EXAMPLE 7

This example illustrates another conversion of perfluoropropene to epoxyperfluoropropane.

Using the same conditions as described in the immediately preceding example, but maintaining the reactor at about 60° C., the effluent trapped at −78° is found to be 70 percent unreacted perfluoropropene, 12 percent perfluoropropane and 16 percent 1,2-epoxyperfluoropropane. Stream samples are taken during the run after 23, 36 and 87 minutes, respectively. The first two are found to have a 34 percent epoxide content, and the third is 46 percent epoxide.

EXAMPLE 8

This example illustrates the reaction of oxygen difluoride and perfluoropropene under static conditions.

A nickel bomb (Carius tube) of about 90 ml. capacity is charged with 8.9 mMoles of oxygen difluoride and 8.6 moles of perfluoropropene. After three and a half days at −78° C., it is found that no reaction has occurred. The mixture is then held at 0° C. for 85 minutes, after which analysis of a sample of the reaction mixture shows that of the carbonaceous contents, 32 percent is 1,2-epoxyperfluoropropane, 33 percent is perfluoropropane and 34 percent is unreacted perfluoropropene. When the reaction mixture has been maintained at between 0° and 20° C. for another 16 hours, conversion of the perfluoropropene is substantially complete, and the reaction mixture contains 44 percent 1,2-epoxyperfluoropropane and 51 percent perfluoropropane, 2 percent trifluoroacetyl fluoride and 1 percent perfluoropropene.

EXAMPLE 9

This example describes another batch reaction of perfluoropropene with oxygen difluoride.

The reactor used is the nickel bomb described above, connected to a pressure gauge. The bomb is cooled in liquid air to maintain it at −188° C. while 40 ml. (NTP) (1.8 mMoles) of gaseous perfluoropropene and 33 ml. (1.5 mMoles) of gaseous oxygen difluoride are condensed into the reactor. Then the temperature of the mixture is raised to 0° C. The pressure drops from an initial reading of 30 inches (in.) Hg to 6.8 in. After 68 minutes at 0°, the pressure is 13 in. Hg. The reactor contents are analyzed: of the perfluoropropene charged, 97 percent is reacted and the composition of the reaction product is found to be 36 percent 1,2-epoxyperfluoropropane and 39 percent perfluoropropane.

EXAMPLE 10

This example describes the conversion of a branched chain perfluoro olefin to a perfluorinated epoxide.

The nickel bomb described above is charged with 135 ml. (6.0 mMoles) of gaseous perfluoroisobutene, $(CF_3)_2C=CF_2$, and 144 ml. (6.4 mMoles) of gaseous $OF_2$. After 90 minutes at 0° C., the reactor temperature is raised to 25° C. and maintained at this temperature for further 90 minutes. It is found that 85 percent of the perfluoroisobutene is unreacted, and 4 percent of the reactor contents consist of an approximately equimolar mixture of isoperfluorobutane and 1,2-epoxyperfluoroisobutane. The reactor is maintained at 25° C. for another 67 hours. At the end of this time, 78 percent of the reaction mixture is still unreacted perfluoroisobutene, 7 percent is perfluoroisobutane, 5 percent is 1,2-epoxyperfluoroisobutane and 2 percent is trifluoromethyl hypofluorite.

EXAMPLE 11

The nickel reactor used in the immediately preceding example is charged with 140 ml. (6.2 mMoles) of gaseous perfluoroisobutene and 150 ml. (6.8 mMoles) of gaseous oxygen difluoride. The reaction mixture is maintained at 55° C. for 18 hours. Of the reactor contents, 60 percent is unreacted perfluoroisobutene, 17 percent is perfluoroisobutane and 15 percent is 1,2-epoxyperfluoroisobutane. The reaction mixture also contains tetrafluoromethane and trifluoromethyl hypofluorite.

EXAMPLE 12

This example illustrates the conversion of perfluoroisobutene to epoxyperfluoroisobutane in relatively high conversions and yield.

The nickel bomb described above is charged with 144 ml. (6.8 mMoles) of the gaseous oxygen difluoride and 144 ml. (6.4 mmoles) of gaseous perfluoroisobutene. The reaction mixture is maintained at 90° C. for 16 hours, and then the bomb is opened and the contents analyzed. Of the reaction mixture, 17 percent is unreacted perfluoroisobutene, 40 percent is perfluoroisobutane and 32 percent is 1,2-epoxyperfluoroisobutane.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. A process for producing fluorinated compounds which comprises reacting a perfluorinated olefin with oxygen difluoride or oxygen difluoride mixed with gaseous inert diluents to produce a mixture comprising a perfluorinated 1,2 epoxide and a perfluorinated alkane.

2. The process of claim 1 wherein said reactants are reacted at a temperature between about −50° C. to about 200° C.

3. The precess of claim 2 wherein said perfluorinated olefin is a perfluorinated open chain alkene.

4. The process of claim 2 wherein said perfluorinated olefin is a terminally unsaturated perfluorinated open chain alkene.

5. The process of claim 2 wherein said perfluorinated olefin is perfluoropropene.

6. The process of claim 2 wherein said perfluorinated olefin is perfluoroisobutene.

7. A process for producing a perfluorinated epoxide which comprises reacting, at a temperature between about −50° C. to about 200° C., oxygen difluoride or oxygen difluoride mixed with gaseous inert diluents with a perfluorinated olefin of the formula $(R_f)_2 C=C R_f2)$ where each $R_f$ radical is a fluorine containing substituent selected from the class consisting of F and perfluorinated hydrocarbon radicals free of aliphatic unsaturation and said perfluorinated olefin contains from two to 14 carbon atoms, to produce a mixture comprising a perfluorinated epoxide and a perfluorinated alkane and separating said perfluorinated epoxide from said mixture.

8. The process of claim 7 wherein said perfluorinated olefin contains from two to six carbon atoms.

9. The method of producing a perfluorinated 1,2 epoxide which consists of contacting a perfluorinated olefin with a reagent consisting essentially of oxygen difluoride.

* * * * *

PO-1050
(5/69)

UNITED STATES PATENT OFFICE
CERTIFICATE OF CORRECTION

Patent No. 3,622,601      Dated November 23, 1971

Inventor(s) James W. Dale

It is certified that error appears in the above-identified patent and that said Letters Patent are hereby corrected as shown below:

Column 1, between lines 1 and 2, insert as the first paragraph -- This application is a continuation of application Serial No. 293,225, filed June 28, 1963, now abandoned. --. Column 4, line 49, "moles" should read -- mmoles --. Column 6, line 30, "c=c" should read -- C=C --.

Signed and sealed this 4th day of July 1972.

(SEAL)
Attest:

EDWARD M. FLETCHER, JR.      ROBERT GOTTSCHALK
Attesting Officer      Commissioner of Patents